(12) United States Patent
Maruo

(10) Patent No.: US 9,575,697 B2
(45) Date of Patent: Feb. 21, 2017

(54) PRINTING DEVICE, SYSTEM, AND METHOD WHEN CHANGING OF PRINTERS

(71) Applicant: FUJI XEROX CO., LTD., Tokyo (JP)

(72) Inventor: Masatoshi Maruo, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/602,775

(22) Filed: Jan. 22, 2015

(65) Prior Publication Data
US 2015/0212764 A1 Jul. 30, 2015

(30) Foreign Application Priority Data
Jan. 29, 2014 (JP) .................. 2014-014921

(51) Int. Cl.
G06F 3/12 (2006.01)
G06F 15/00 (2006.01)

(52) U.S. Cl.
CPC .............. *G06F 3/126* (2013.01); *G06F 3/1203* (2013.01); *G06F 3/1224* (2013.01); *G06F 3/1273* (2013.01); *G06F 3/1253* (2013.01); *G06F 3/1268* (2013.01)

(58) Field of Classification Search
CPC ...... G06F 3/126; G06F 3/1203; G06F 3/1208; G06F 3/1226; G06F 3/1273; G06F 3/1268; G06F 3/1224; G06F 3/1253
USPC .............. 358/1.1, 1.9, 1.13, 1.14, 1.15, 1.18
See application file for complete search history.

(56) References Cited

U.S. PATENT DOCUMENTS

| | | | | |
|---|---|---|---|---|
| 6,967,728 | B1* | 11/2005 | Vidyanand | G06F 3/1204 358/1.1 |
| 7,706,002 | B2* | 4/2010 | Nozato | 358/1.13 |
| 8,411,303 | B2* | 4/2013 | DeRoller | 358/1.15 |
| 2004/0184069 | A1* | 9/2004 | Mifune | G06K 15/00 358/1.15 |
| 2004/0257609 | A1* | 12/2004 | Tokimatsu | 358/1.15 |
| 2007/0177202 | A1* | 8/2007 | Miyata | 358/1.15 |
| 2008/0232842 | A1* | 9/2008 | Honma | G03G 15/5016 399/81 |
| 2011/0029346 | A1* | 2/2011 | Kong | 705/8 |
| 2011/0194143 | A1* | 8/2011 | Yamaguchi | 358/1.15 |
| 2015/0077800 | A1* | 3/2015 | Yamagishi et al. | 358/1.15 |

FOREIGN PATENT DOCUMENTS

JP 2002-175258 A 6/2002

* cited by examiner

*Primary Examiner* — Gabriel Garcia
(74) *Attorney, Agent, or Firm* — Oliff PLC

(57) ABSTRACT

A print instruction assistance device includes an acquisition unit, a recognition unit, and an output unit. The acquisition unit acquires usage record information concerning a usage record of multiple functions of each of multiple printers. The recognition unit recognizes a change of a printer to be used for printing among the multiple printers from a first printer to a second printer. The output unit outputs information indicating a function which is identified in accordance with the usage record information among multiple functions of the first printer and which is not included in the second printer.

7 Claims, 13 Drawing Sheets

FIG. 10

```
THE FOLLOWING FUNCTIONS AVAILABLE ON THE PREVIOUS PRINTER
ARE NOT AVAILABLE ON THE SELECTED PRINTER.

A3 SIZE PAPER

TWO-HOLE PUNCHING

TWO STAPLES ON A4-SIZE LONG EDGE

TWO STAPLES ON A4-SIZE SHORT EDGE
```

PRINTING DEVICE, SYSTEM, AND METHOD WHEN CHANGING OF PRINTERS

CROSS-REFERENCE TO RELATED APPLICATIONS

This application is based on and claims priority under 35 USC 119 from Japanese Patent Application No. 2014-014921 filed Jan. 29, 2014.

BACKGROUND

Technical Field

The present invention relates to a print instruction assistance device, a printing system, a method, and a non-transitory computer readable medium.

SUMMARY

According to an aspect of the invention, there is provided a print instruction assistance device including an acquisition unit, a recognition unit, and an output unit. The acquisition unit acquires usage record information concerning a usage record of multiple functions of each of multiple printers. The recognition unit recognizes a change of a printer to be used for printing among the multiple printers from a first printer to a second printer. The output unit outputs information indicating a function which is identified in accordance with the usage record information among multiple functions of the first printer and which is not included in the second printer.

BRIEF DESCRIPTION OF THE DRAWINGS

An exemplary embodiment of the present invention will be described in detail based on the following figures, wherein:

FIG. 10 illustrates an example of a message output by the message controller of the terminal apparatus according to the exemplary embodiment of the present invention.

DETAILED DESCRIPTION

An exemplary embodiment of the present invention will be described hereinafter in detail with reference to the accompanying drawings.

Overall Configuration of Image Forming System

Figure 1:
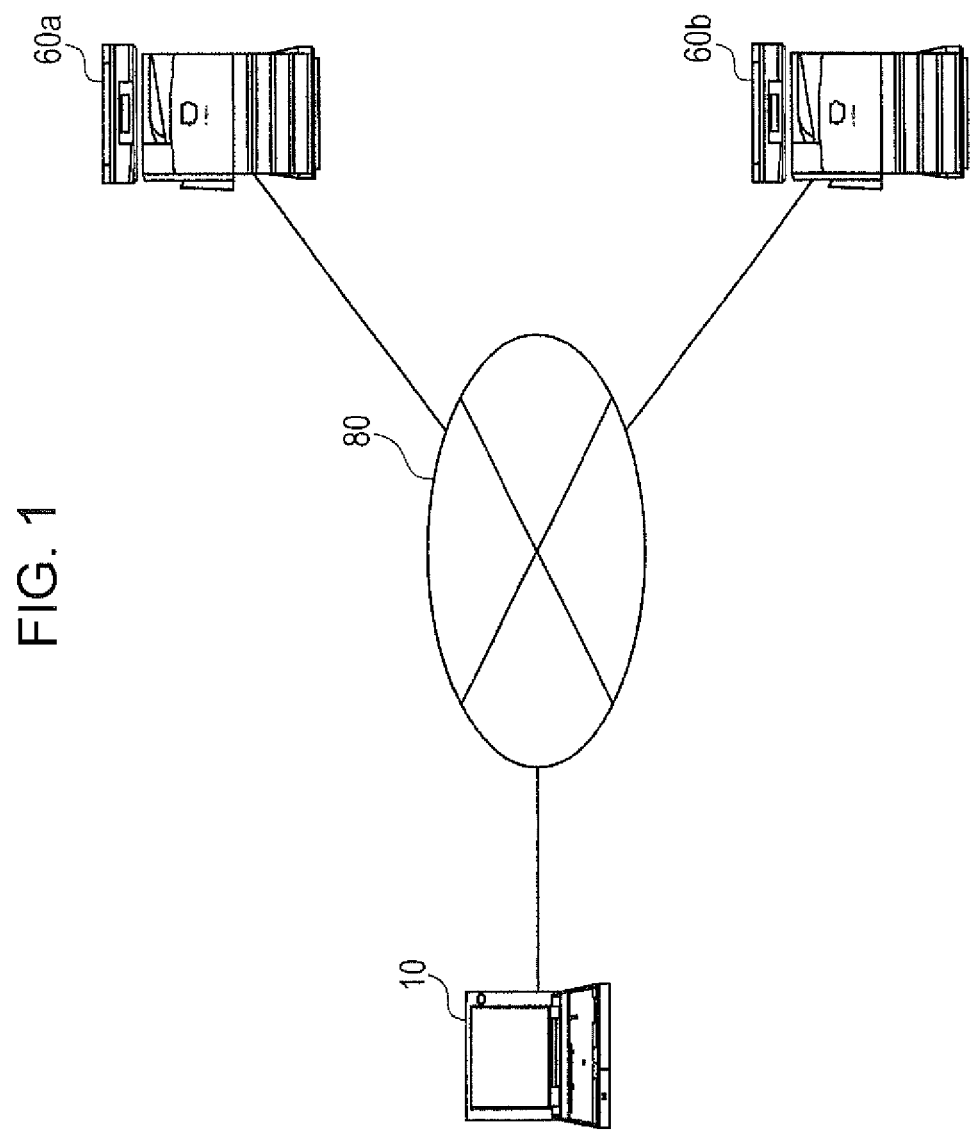
FIG. 1 illustrates an example overall configuration of an image forming system according to an exemplary embodiment of the present invention.

FIG. 1 illustrates an example overall configuration of an image forming system according to this exemplary embodiment. As illustrated in FIG. 1, the image forming system is configured such that a terminal apparatus 10 is connected to image forming apparatuses 60a and 60b via a network 80. While a single terminal apparatus 10 is illustrated in FIG. 1, the number of terminal apparatuses is not limited to one. The image forming apparatuses 60a and 60b are individually referred to as the image forming apparatus 60 and are collectively referred to as the image forming apparatuses 60, unless otherwise individually designated. The number of image forming apparatuses 60 is not limited to two. In this exemplary embodiment, an image forming system is provided as an example of a printing system.

The terminal apparatus 10 is a client computer used to instruct the image forming apparatus 60 to form an image. Specifically, the terminal apparatus 10 creates data using application software (hereinafter referred to simply as an "application") operating on an operating system (OS), such as document creation software, spreadsheet software, or drawing software, and instructs the image forming apparatus 60 to form an image based on the created data. Examples of the terminal apparatus 10 may include a notebook personal computer (PC), a tablet PC, a personal digital assistant (PDA), a smartphone, and a mobile phone. In this exemplary embodiment, the terminal apparatus 10 is provided as an example of a print instruction apparatus.

The image forming apparatus 60 is an apparatus that forms an image on a recording medium such as paper and outputs the recording medium as a printed medium. The image forming apparatus 60 may be an apparatus only having a printer function, or may be an apparatus having additional functions such as a scanner function, a copying function, and a facsimile function, which will be described below. In this exemplary embodiment, the image forming apparatus 60 is provided as an example of a printer.

The network 80 is a communication unit used to communicate information between the terminal apparatus 10 and the image forming apparatuses 60a and 60b, and may be, for example, the Internet.

Hardware Configuration of Terminal Apparatus

Figure 2:
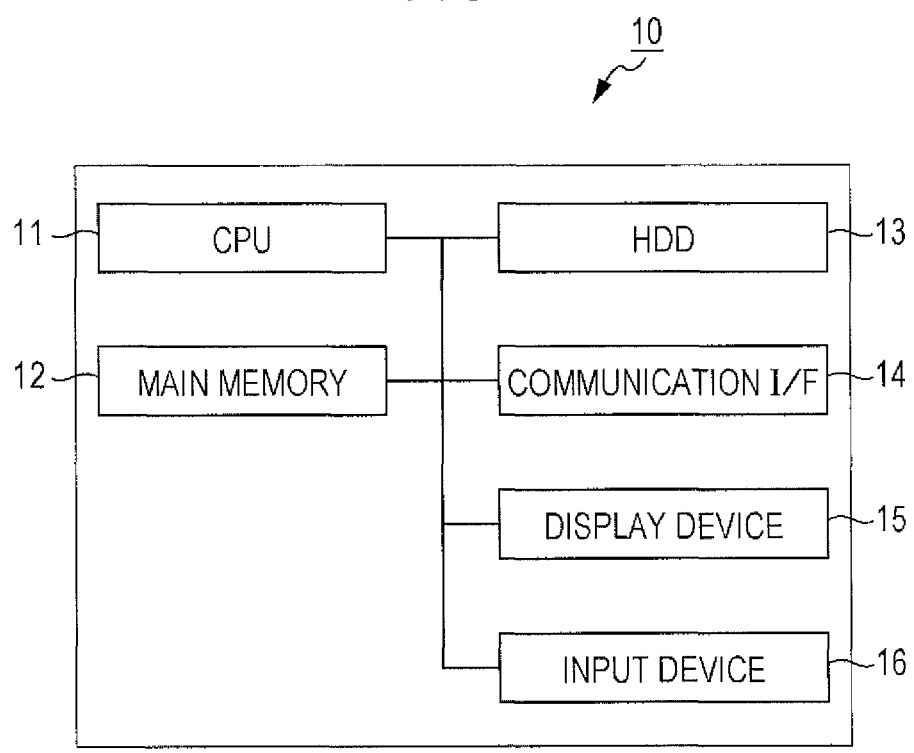
FIG. 2 illustrates an example hardware configuration of a terminal apparatus according to the exemplary embodiment of the present invention.

FIG. 2 illustrates an example hardware configuration of the terminal apparatus 10. As illustrated in FIG. 2, the terminal apparatus 10 includes a central processing unit (CPU) 11 serving as an arithmetic operation unit, a main memory 12 serving as a memory, and a hard disk drive (HDD) 13. The CPU 11 executes various kinds of software such as an OS and applications to implement the functions described below. The main memory 12 is a storage area for storing various kinds of software, data used for executing the software, and so forth. The HDD 13 is a storage area for storing data to be input to various kinds of software, data output from various kinds of software, and so forth. In a case where the terminal apparatus 10 is a mobile phone or a smartphone, flash storage may be used instead of the HDD 13.

The terminal apparatus 10 further includes a communication interface (hereinafter referred to as the "communication I/F") 14 for communication with an external device, a display device 15 such as a display, and an input device 16 including a keyboard and a mouse.

Hardware Configuration of Image Forming Apparatus

Figure 3:
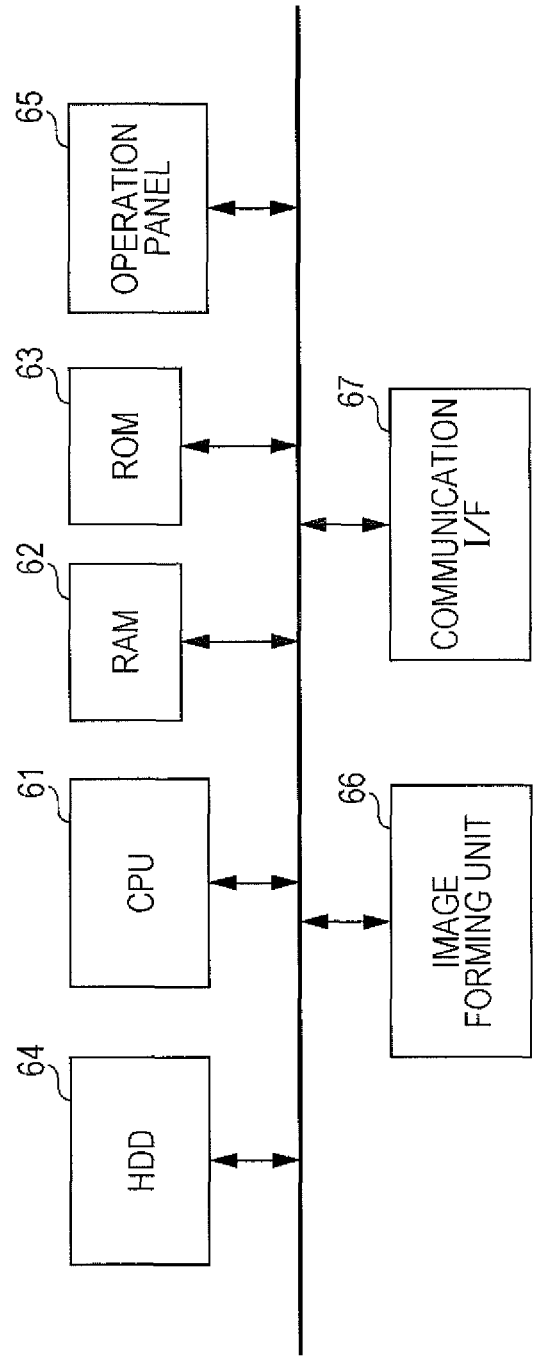
FIG. 3 illustrates an example hardware configuration of an image forming apparatus according to the exemplary embodiment of the present invention.

FIG. 3 illustrates an example hardware configuration of the image forming apparatus 60. As illustrated in FIG. 3, the image forming apparatus 60 includes a CPU 61, a random access memory (RAM) 62, a read only memory (ROM) 63, an HDD 64, an operation panel 65, an image forming unit 66, and a communication interface (hereinafter referred to as the "communication I/F") 67.

The CPU 61 loads various programs stored in the ROM 63 or the like onto the RAM 62 and executes the programs to implement the functions described below. The RAM 62 is a memory used as a working memory or the like of the CPU 61, and the ROM 63 is a memory for storing various programs executed by the CPU 61, and so forth. The HDD 64 is, for example, a magnetic disk device that stores image data and the like used to form an image using the image forming unit 66.

The operation panel 65 is a touch panel that accepts display of various kinds of information and input of operation by a user. The operation panel 65 includes a display on which various kinds of information are displayed, and a position detection sheet for detecting a position pointed at by a finger, a stylus pen, or the like. Instead of a touch panel, a display and a keyboard may be used.

The image forming unit 66 forms an image on a recording medium. The image forming unit 66 may form an image by an electrophotographic method by which toner applied to a photoconductor is transferred onto a recording medium to form an image, or may form an image by an inkjet method by which ink is ejected onto a recording medium to form an image.

The communication I/F 67 transmits and receives various kinds of information to and from another device via a network.

Although not illustrated in FIG. 3, the image forming apparatus 60 may include an image reading unit configured to read an image recorded on a recording medium such as paper. That is, the image forming apparatus 60 may have, in addition to the printer function using the image forming unit 66, a scanner function using the image reading unit and a copying function using the image reading unit and the image forming unit 66. The image forming apparatus 60 may also have a facsimile function using the image reading unit, the image forming unit 66, and the communication I/F 67.

Universal Printer Driver

In this exemplary embodiment, in the image forming system described above, the terminal apparatus 10 has a universal printer driver installed therein. The universal printer driver is a printer driver common to multiple models, in which printer drivers for image forming apparatuses 60 of multiple models are combined into a single printer driver so that the image forming apparatus 60 specified as an output destination is selectable each time a printing operation is performed. The universal printer driver allows a user to select one of the multiple image forming apparatuses 60 on the network 80 to instruct the selected image forming apparatus 60 to perform printing without having to install the printer drivers respectively supporting the image forming apparatuses 60 into a PC.

To that end, in order to enable printing on the multiple image forming apparatuses 60 on the network 80, the universal printer driver includes a dedicated printer driver, a general-purpose printer driver, and a basic-mode printer driver as modules.

The dedicated printer driver is a printer driver configured to make all the unique functions of an image forming apparatus 60 of a predetermined model selectable and configurable to make the best use of the performance and quality of the image forming apparatus 60 of the model. The dedicated printer driver provides functions equivalent to those of a printer driver supporting each existing model and also provides functions not supported by image forming apparatuses 60 of the other models.

The general-purpose printer driver is a printer driver configured to make common functions of image forming apparatuses 60 of predetermined multiple models selectable and configurable so as to be capable of supporting the image forming apparatuses 60 of the models. The general-purpose printer driver provides standard functions supported by image forming apparatuses 60 manufactured by the same company, which are generally available on the market. The general-purpose printer driver may sometimes provide functions not supported by image forming apparatuses 60 manufactured by other companies, but does not provide functions unique to a model.

The basic-mode printer driver is also a printer driver configured to be capable of supporting image forming apparatuses 60 of multiple models, and provides a printing function that is minimal enough not to cause errors in most of the Printer Command Language (PCL) 6 compatible image forming apparatuses 60. The basic-mode printer driver provides fewer functions than the dedicated printer driver or the general-purpose printer driver. The basic-mode printer driver is a printer driver that places a strong emphasis on the large number of output compatible devices rather than the huge abundance of function types to be provided.

In the universal printer driver, a selection of models may be switched when multiple image forming apparatuses 60 are used and the image forming apparatuses 60 are of different models. That is, if the universal printer driver includes dedicated printer drivers respectively supporting image forming apparatuses 60 of multiple models, the dedicated printer drivers may be switched.

Here, consideration will be given of the switching of dedicated printer drivers in the universal printer driver from a dedicated printer driver supporting an image forming apparatus 60 of a model A to a dedicated printer driver supporting an image forming apparatus 60 of a model B. In this case, the functions provided by the model A may be different from the functions provided by the model B. For example, the model A provides a two-sided or duplex printing function and a staple function, whereas the model B does not provide such functions. In this case, a user who frequently uses the duplex printing function and the staple function on the model A may also open a user interface (UI) screen of an image forming apparatus 60 of the model B and attempt to select the duplex printing function and the staple function after the output destination has been switched to the model B. The user may also misunderstand that the duplex printing function and the staple function are also active on the image forming apparatus 60 and perform a printing operation.

In the related art, as described above, it is difficult to effectively provide a user who has switched the models of the image forming apparatuses 60 for the output destination with information concerning a function that is no longer available due to the difference in capability between the two models that have been switched.

It may also be possible that a user who has switched the models of the image forming apparatuses 60 for the output destination is informed of a list of functions that are provided by the original model but are not provided by the new or replacement model. In this case, a function that has not been used by the user may be possibly included in the list. Such information is not useful to the user.

Accordingly, in this exemplary embodiment, when a user has changed the model to be used, the user is informed of a function not available on the replacement model among the functions previously used by the user on the original model due to the difference in function between the two models before and after the change.

The situation described above will also occur during switching of printer drivers (1) from a dedicated printer driver for a given model which is included in the universal printer driver to the general-purpose printer driver or basic-mode printer driver which is included in the universal printer driver, (2) from a dedicated printer driver for a given model which is included in the universal printer driver to a printer driver for a different model which is installed separately from the universal printer driver, (3) from a printer driver for a given model which is installed separately from the universal printer driver to a dedicated printer driver for a different model which is included in the universal printer driver, and (4) from a printer driver for a given model which is installed separately from the universal printer driver to the general-purpose printer driver or basic-mode printer driver which is included in the universal printer driver. In the following, a description will be given of the switching of printer drivers from a dedicated printer driver for a given model which is included in the universal printer driver to a dedicated printer driver for a different model which is included in the universal printer driver.

Functional Configuration of Terminal Apparatus

Figure 4:
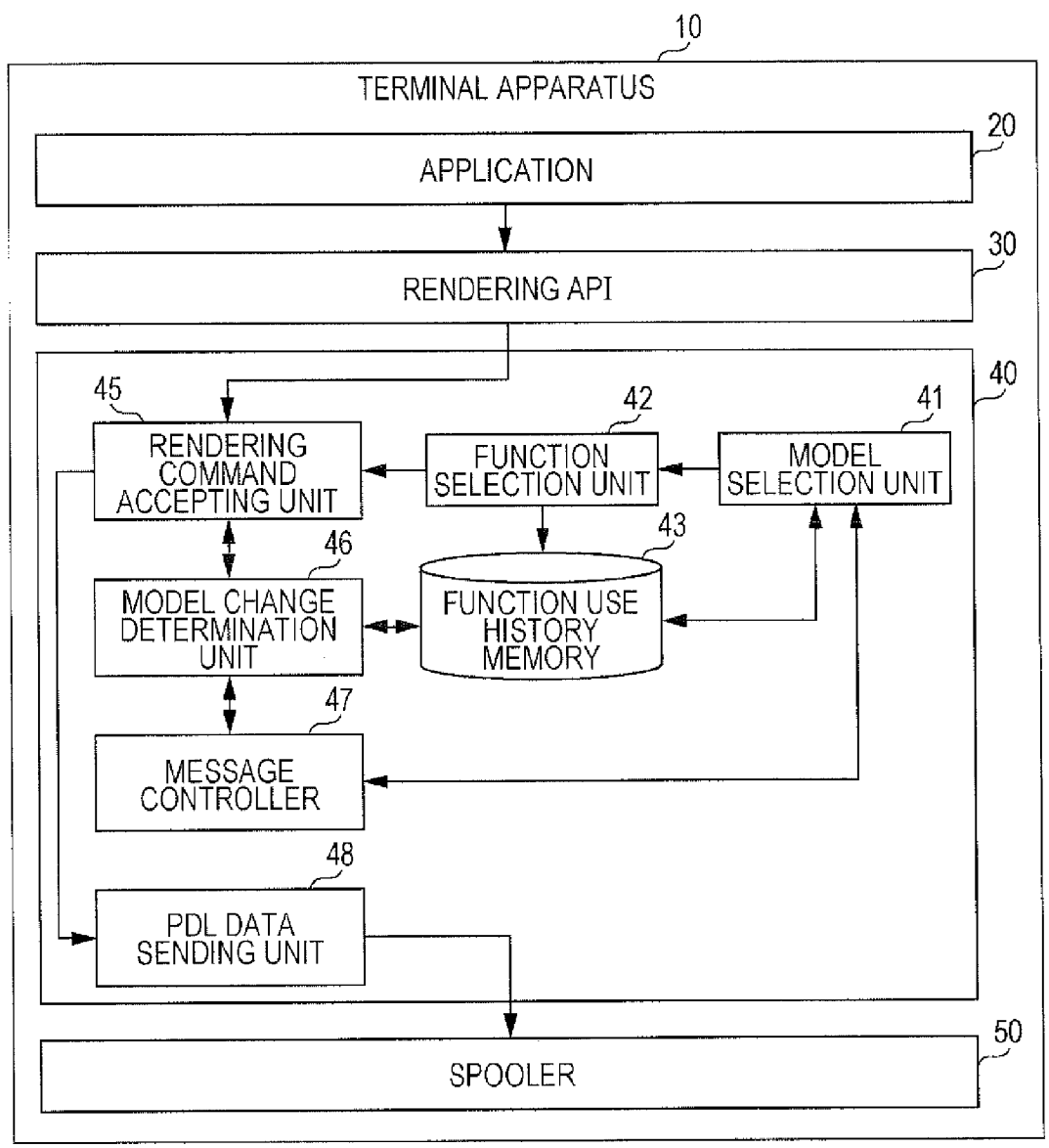
FIG. 4 is a block diagram illustrating an example functional configuration of the terminal apparatus according to the exemplary embodiment of the present invention.

FIG. 4 is a block diagram illustrating an example functional configuration of the terminal apparatus 10. As illustrated in FIG. 4, the terminal apparatus 10 includes an application 20, a rendering application programming interface (API) 30, a universal printer driver 40, and a spooler 50.

The application 20 is application software such as document creation software, spreadsheet software, or drawing software. When a user performs an operation of requesting the creation of data, the application 20 generates data such as document data, table data, or drawing data. When a user performs an operation of requesting the printing of the generated data, the application 20 calls the rendering API 30.

The rendering API 30 is an API for the rendering of text, drawings, and the like, and corresponds to the Microsoft Windows (registered trademark) graphic device interface (GSI), for example.

As described above, the universal printer driver 40 is a printer driver that allows a user to give instructions to image forming apparatuses 60 of multiple models to form an image by using a single printer driver. Upon receipt of a rendering command from the application 20 via the rendering API 30, the universal printer driver 40 generates data written in Page Description Language (PDL) (hereinafter referred to as the "PDL data") to instruct an image forming apparatus 60 of a model selected from among the multiple models to form an image in accordance with the rendering command. In this exemplary embodiment, a portion implemented by the universal printer driver 40 of the terminal apparatus 10 is provided as an example of a print instruction assistance device.

When the PDL data is output by the universal printer driver 40, the spooler 50 receives and spools the PDL data, and transmits the spooled PDL data to the image forming apparatus 60 via the communication I/F 14 (see FIG. 2).

The universal printer driver 40 will now be described in more details. The universal printer driver 40 includes a model selection unit 41, a function selection unit 42, and a function use history memory 43. The universal printer driver 40 further includes a rendering command accepting unit 45, a model change determination unit 46, a message controller 47, and a PDL data sending unit 48. In other words, the universal printer driver 40 operates, thereby allowing the model selection unit 41, the function selection unit 42, the function use history memory 43, the rendering command accepting unit 45, the model change determination unit 46, the message controller 47, and the PDL data sending unit 48 to be implemented in the terminal apparatus 10.

The model selection unit 41 displays a user interface screen (hereinafter referred to as the "UI screen") for selecting the model of the image forming apparatus 60 specified as an output destination. The UI screen will be described in detail below. The model selection unit 41 accepts the operation of a user (or a print instructor) on the UI screen to select a model. If the model has been changed, the model selection unit 41 acquires a list of functions previously used on the original model and a list of functions of the replacement model from the function use history memory 43, and calls the message controller 47 using the acquired lists as arguments. In this exemplary embodiment, the model selection unit 41 is provided as an example of a recognition unit that recognizes a change of a printer to be used for printing, and as an example of an acquisition unit that acquires usage record information.

The function selection unit 42 displays a UI screen for selecting a function to be used for output to the image forming apparatus 60 of the model selected by the model selection unit 41. The UI screen will also be described in detail below. Then, the function selection unit 42 accepts the operation of the user on the UI screen to select a function, and holds the selected function.

The function use history memory 43 stores a history of use of functions (hereinafter referred to as the "function use history") for each model of image forming apparatus 60. The function use history will also be described in detail below.

The rendering command accepting unit 45 accepts the rendering command generated by the application 20 for the image forming apparatus 60, which serves as an example of print instruction information, via the rendering API 30. If the rendering command includes information that designates the model of the output destination and the function to be used, the rendering command accepting unit 45 calls the model change determination unit 46 using the information as an argument. In addition, the rendering command accepting unit 45 translates the rendering command into the PDL output format that the image forming apparatus 60 supports, and adds a control command in accordance with the selected function to generate PDL data which will be output to the image forming apparatus 60 of the selected model.

The model change determination unit 46 determines whether or not the model has been changed, in accordance with the information that designates a model, which is received from the rendering command accepting unit 45, and the function use history stored in the function use history memory 43. If the model has been changed, the model change determination unit 46 acquires a list of functions previously used on the original model and a list of functions of the replacement model from the function use history memory 43, and calls the message controller 47 using the acquired lists as arguments. In this exemplary embodiment, the model change determination unit 46 is provided as an example of a recognition unit that recognizes a change of a printer to be used for printing, and as an example of an acquisition unit that acquires usage record information.

The message controller 47 compares the list of functions previously used on the original model with the list of functions of the replacement model, and displays, on the display device 15, a function not provided by the replacement model among the functions previously used on the original model. Then, control is returned to the caller. In this exemplary embodiment, the message controller 47 is provided as an example of an output unit that outputs information indicating a function.

The processing units described above are implemented by using software and hardware resources in combination. Specifically, for example, the CPU 11 reads a program that implements the model selection unit 41, the function selection unit 42, the rendering command accepting unit 45, the model change determination unit 46, the message controller 47, and the PDL data sending unit 48 onto the main memory 12 from the HDD 13 and executes the read program to implement the processing units described above. The function use history memory 43 is implemented by, for example, the HDD 13.

Figure 5A:
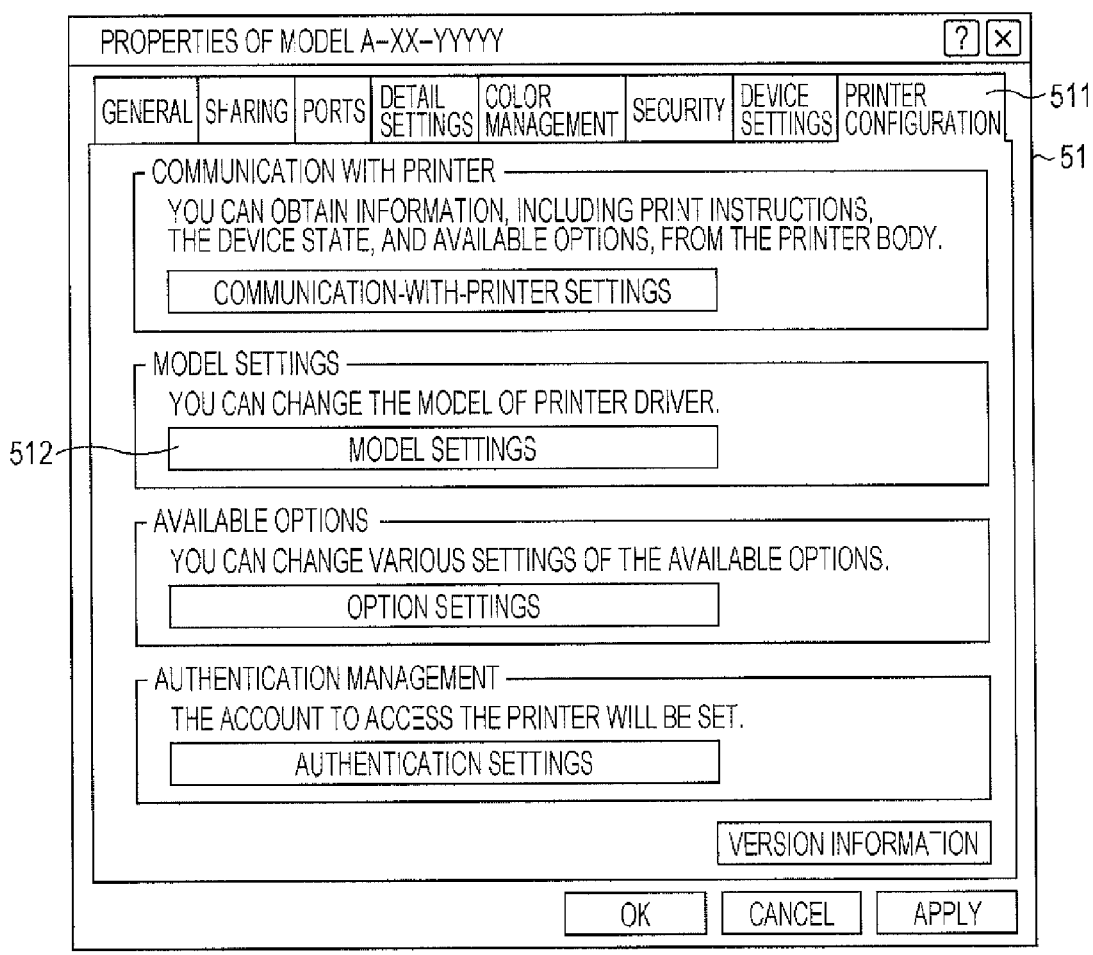
FIGS. 5A and 5B illustrate an example of user interface (UI) screens displayed by a model selection unit of the terminal apparatus according to the exemplary embodiment of the present invention.
Figure 5B:
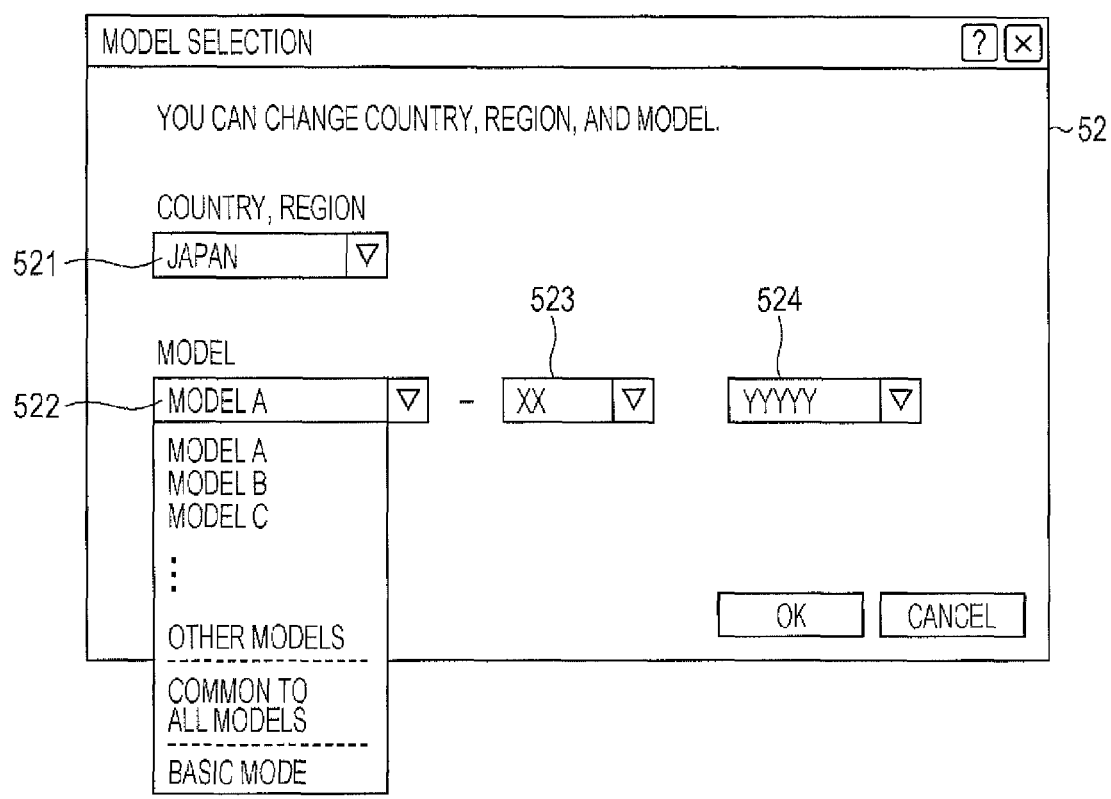

FIGS. 5A and 5B illustrate an example of UI screens displayed by the model selection unit 41 illustrated in FIG. 4. More specifically, first, the model selection unit 41 displays a property screen 51 illustrated in FIG. 5A. When a user presses a "Printer Configuration" tab 511 on the property screen 51 and presses a "Model Settings" button 512, the model selection unit 41 displays a model selection screen 52 illustrated in FIG. 5B. The model selection screen 52 allows the user to change the country or region using a drop-down list 521 and to change the model using drop-down lists 522 to 524.

The drop-down list 522 displays options, which include, for example, a model A, a model B, and a model C. These models are the same company's models with high frequency of use, and are selectable. The "Other Models" option is also displayed, and is selected to present a screen (not illustrated) that allows the user to select, for example, the same company's model with low frequency of use. It is assumed that the universal printer driver 40 has installed therein as modules dedicated printer drivers supporting the models selectable via the options described above. When a model is selected by the model selection unit 41, the function selection unit 42 and the rendering command accepting unit 45 perform the operation defined by the dedicated printer driver supporting the selected model.

The "Common to All Models" option is also displayed in the drop-down list 522. The "Common to All Models" option is selected when, for example, a dedicated printer driver supporting the same company's desired model to be used is not installed. It is assumed that the universal printer driver 40 has installed therein as a module a general-purpose printer driver that provides only functions common to the same company's models. When the "Common to All Models" option is selected by the model selection unit 41, the function selection unit 42 and the rendering command accepting unit 45 perform the operation defined by the general-purpose printer driver.

The "Basic Mode" option is also displayed in the drop-down list 522. The "Basic Mode" option is selected when, for example, the universal printer driver 40 does not have installed therein a dedicated printer driver supporting the desired model to be used, regardless of whether the desired model to be used is the same company's model or not. It is assumed that the universal printer driver 40 has installed therein as a module a basic-mode printer driver that provides only minimum functions to use. When the "Basic Mode" option is selected by the model selection unit 41, the function selection unit 42 and the rendering command accepting unit 45 perform the operation defined by the basic-mode printer driver.

Figure 6A:
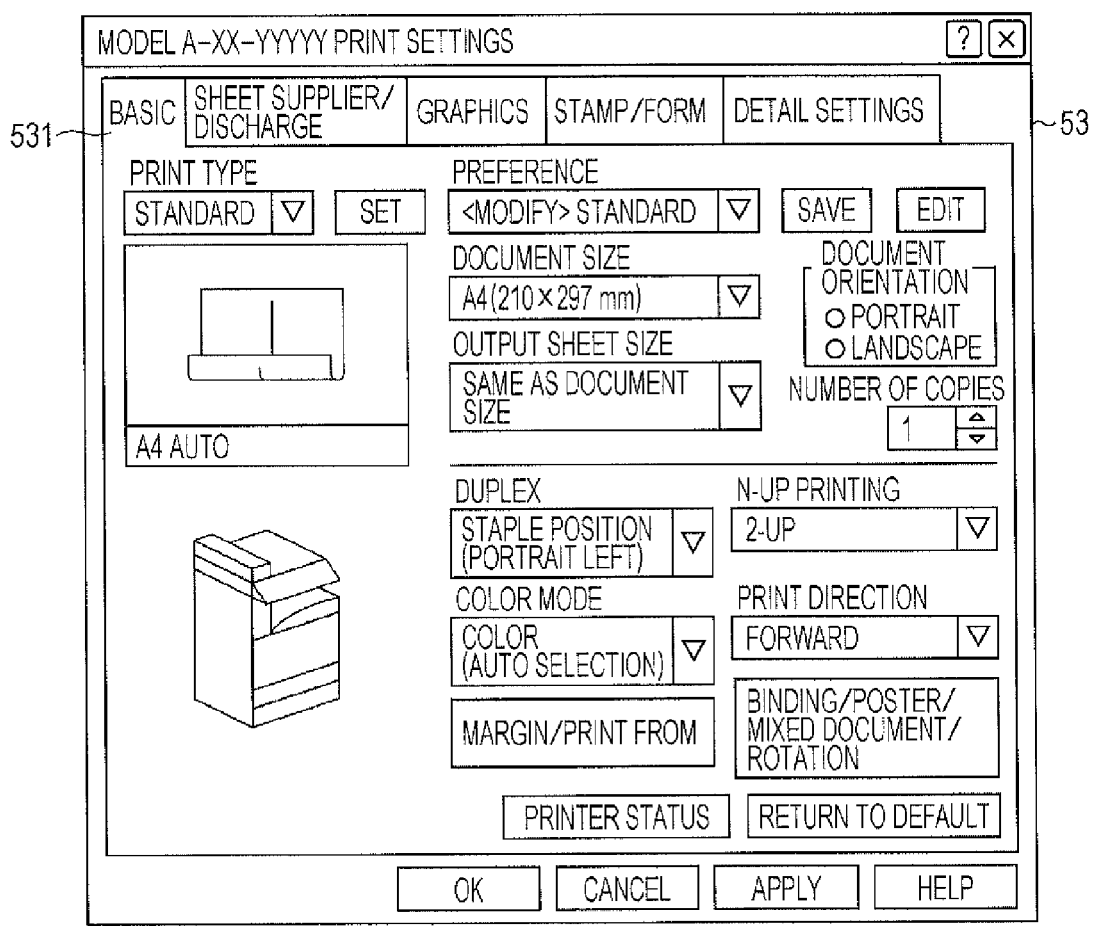
FIGS. 6A and 6B illustrate an example of UT screens displayed by a function selection unit of the terminal apparatus according to the exemplary embodiment of the present invention.
Figure 6B:
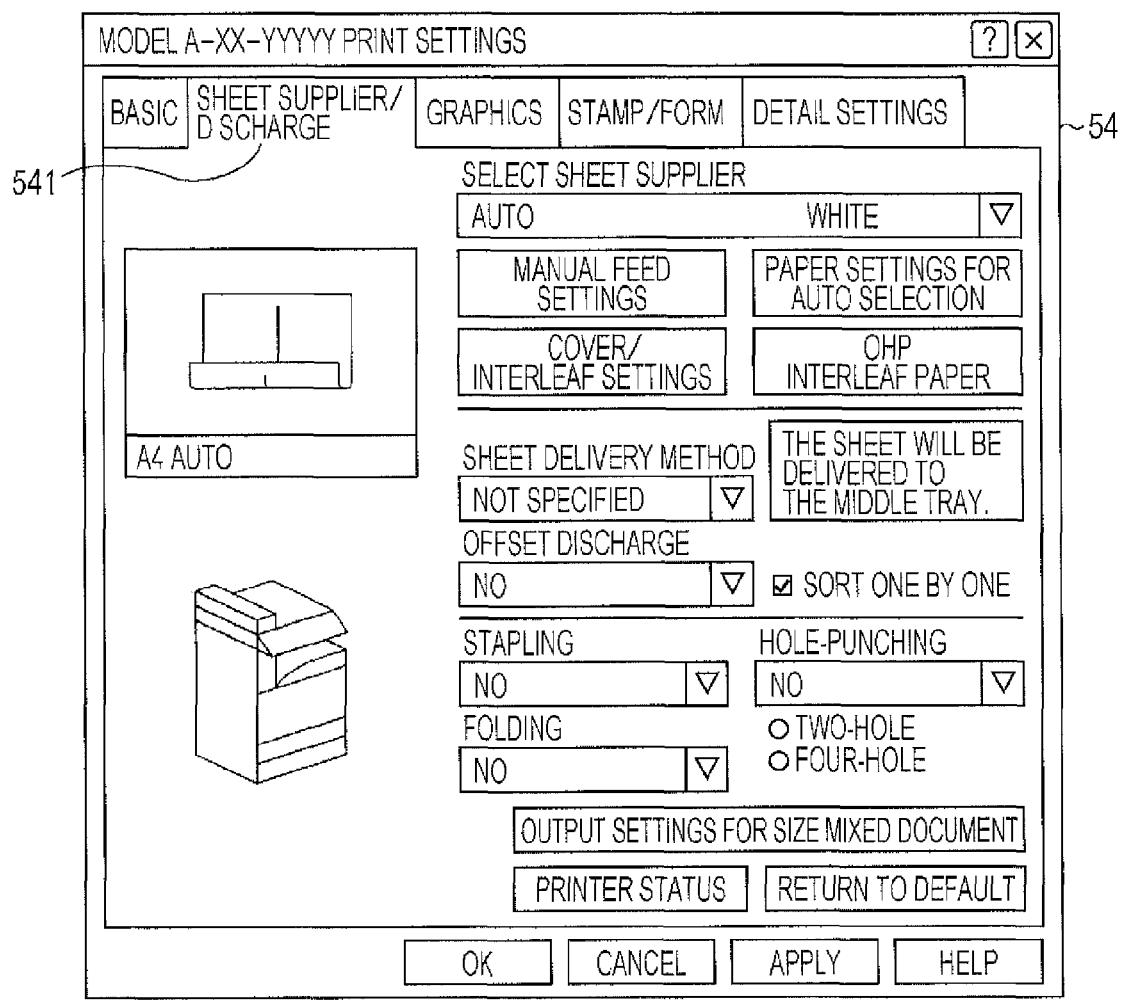

FIGS. 6A and 6B illustrate an example of UI screens displayed by the function selection unit 42 illustrated in FIG. 4. A print setting screen 53 illustrated in FIG. 6A is a UI screen for setting basic print settings which is displayed when a "Basic" tab 531 is pressed. A print setting screen 54 illustrated in FIG. 6B is a UI screen for setting print settings for sheet suppliers or discharging which is displayed when a "Sheet Supplier/Discharge" tab 541 is pressed.

Figure 7:
FIG. 7 illustrates an example of information stored in a function use history memory of the terminal apparatus according to the exemplary embodiment of the present invention.

FIG. 7 illustrates an example of information stored in the function use history memory 43 illustrated in FIG. 4. As illustrated in FIG. 7, the function use history memory 43 stores a history of use of the functions (hereinafter referred to as the "function use history") of each model. Each function use history includes a model name, a last use date and time, and a function usage record. In the function usage record, a usage record indicating, for each of the multiple functions provided by the model, whether or not the function has previously been used. While, in FIG. 7, the function use history memory 43 stores the function use history of the model A and the function use history of the model B, the function use history memory 43 also stores the function use history of any other previously used model.

Operation of Universal Printer Driver

Figure 8:
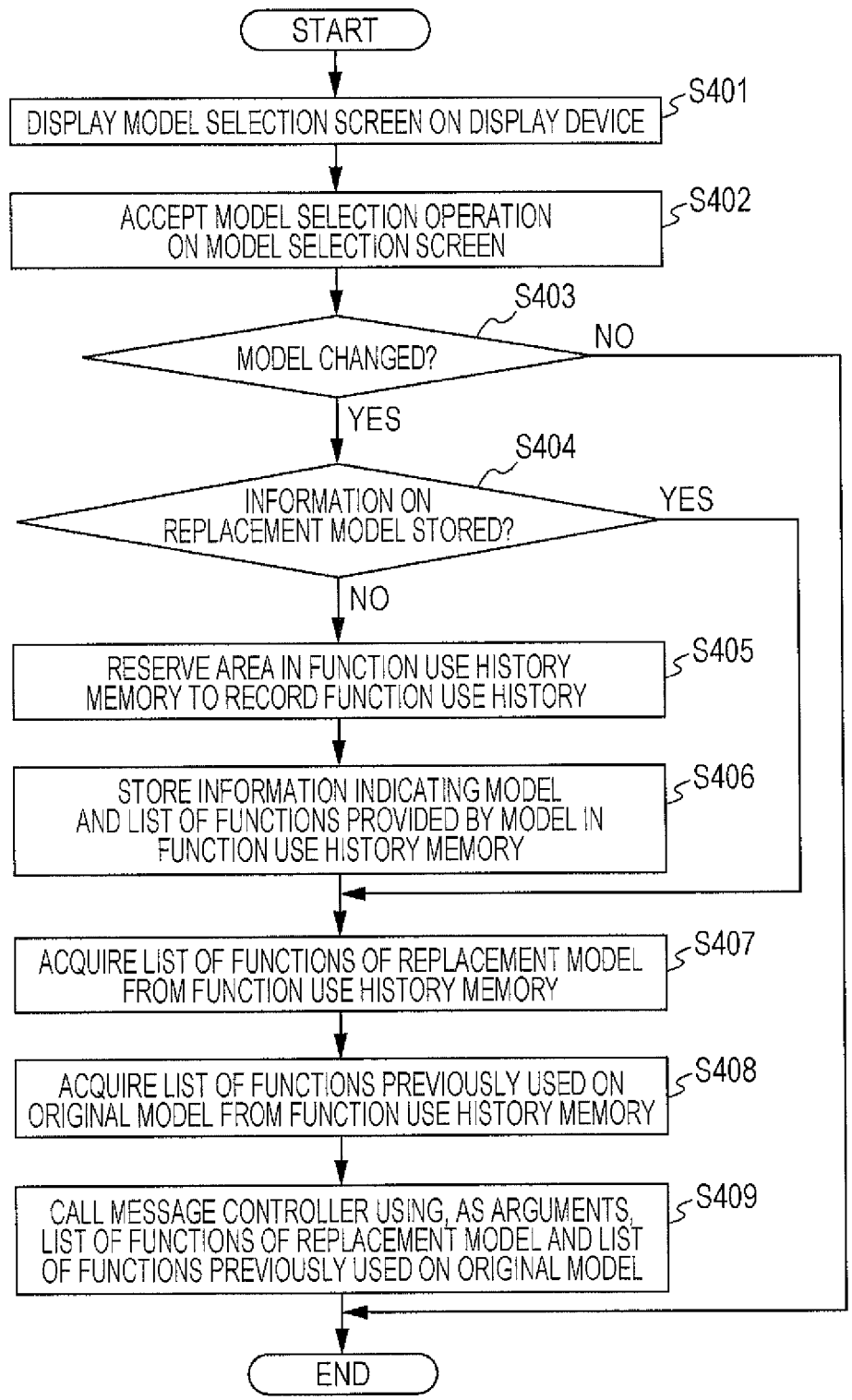
FIG. 8 is a flowchart illustrating an example of the operation of the model selection unit of the terminal apparatus according to the exemplary embodiment of the present invention.

First, the operation of the model selection unit 41 in the universal printer driver 40 to select a model will be described. It is also assumed here that, as described above, printer drivers in the universal printer driver 40 are switched from the dedicated printer driver for the model A to the dedicated printer driver for the model B. FIG. 8 is a flowchart illustrating an example of the operation of the model selection unit 41 in the above-described case.

As illustrated in FIG. 8, the model selection unit 41 displays a model selection screen illustrated in FIG. 5B on the display device 15 (step S401), and accepts the operation of the user on the model selection screen to select the model of the output destination by using the input device 16 (step S402).

Then, the model selection unit 41 determines whether or not the model has been changed by the operation of selecting the model of the output destination (step S403). If it is determined that the model has not been changed, the process ends. If it is determined that the model has been changed, the model selection unit 41 searches the function use history memory 43, and determines whether or not the function use history for the replacement model after the change has been stored (step S404). If it is determined that the function use history for the replacement model has been stored in the function use history memory 43, the process proceeds to step S407. If it is determined that the function use history for the replacement model has not been stored in the function use history memory 43, the model selection unit 41 reserves an area for storing the function use history for the replacement model in the function use history memory 43 (step S405). Then, the model selection unit 41 records information (for example, the model name) that identifies the replacement model and a list of functions provided by the replacement model in the reserved area of the function use history memory 43 in the manner illustrated in FIG. 7 (step S406).

The function use history memory 43 has recorded thereon, together with the list of functions provided by the model, the usage record indicating whether or not each of the functions provided by the model has been previously used. The operation for recording a usage record on the function use history memory 43 will be described below.

Then, the model selection unit 41 acquires a list of functions of the replacement model from the function use history memory 43 (step S407), and also acquires a list of functions previously used on the original model from the function use history memory 43 (step S408).

Then, the model selection unit 41 calls the message controller 47 (step S409) using, as arguments, the list of functions of the replacement model, which is acquired in step S407, and the list of functions previously used on the original model, which is acquired in step S408.

Figure 9:
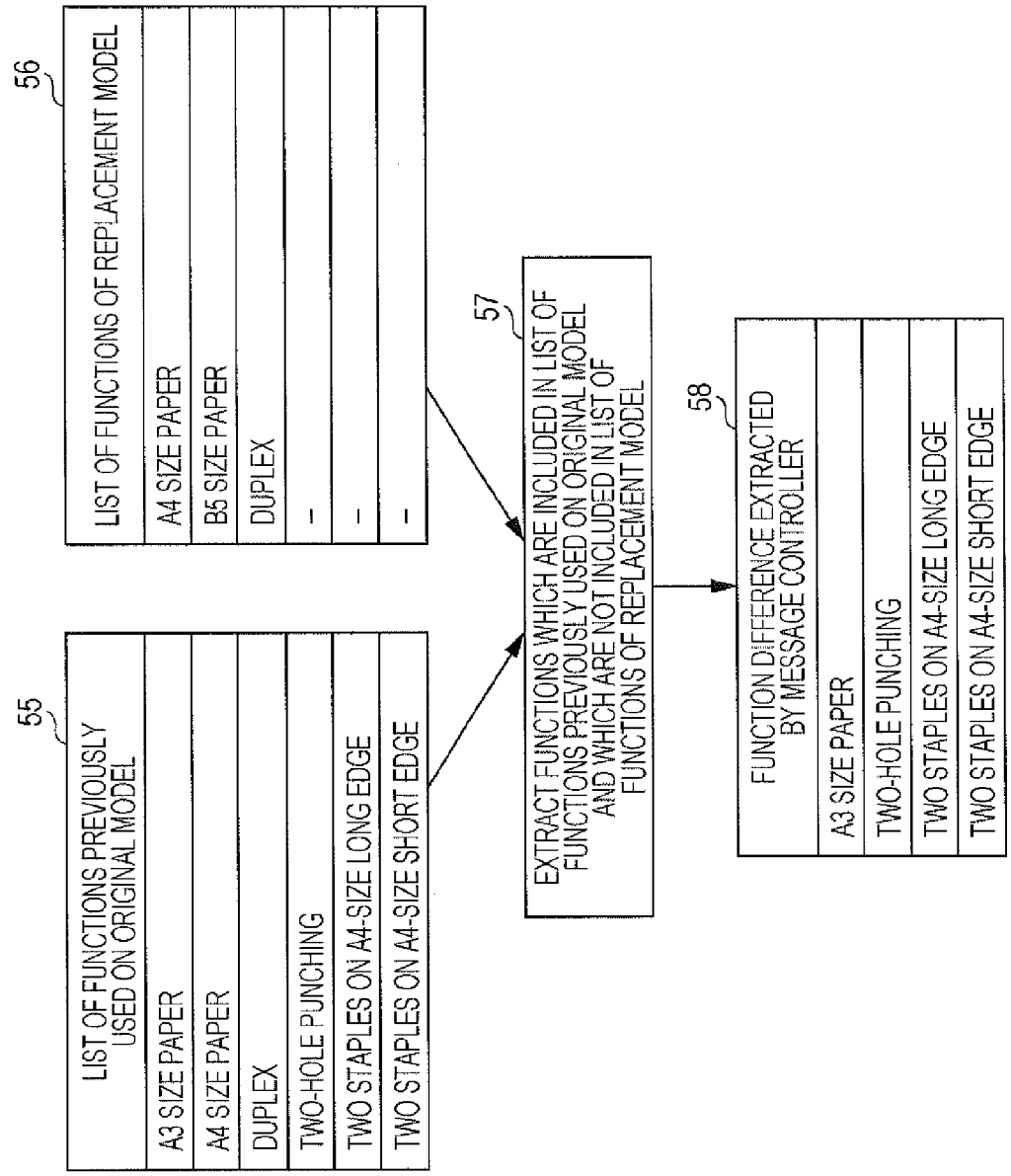
FIG. 9 illustrates an example of the operation of a message controller of the terminal apparatus according to the exemplary embodiment of the present invention.

For example, it is assumed that the information illustrated in FIG. 7 has been stored in the function use history memory 43 at the time when step S406 of FIG. 8 is completed, where the model A is the original model before the change and the model B is the replacement model. Then, at the time when step S409 of FIG. 8 is completed, the arguments used to call the message controller 47 are arguments 55 and 56 illustrated in FIG. 9. The argument 55 is a list of functions previously used on the original model, which is obtained by extracting functions with the usage record marked "YES" from the functions defined in the function usage record in the function use history of the original model. The argument 56 is a list of functions of the replacement model, which is a list of functions defined in the function usage record in the function use history of the replacement model.

The operation of the message controller 47 will now be described. The message controller 47 performs a process 57 based on the list of functions previously used on the original model, which is passed as the argument 55, and the list of functions of the replacement model, which is passed as the argument 56, to extract functions which are included in the list of functions previously used on the original model and which are not included in the list of functions of the replacement model. For example, if the list of functions previously used on the original model is indicated in the argument 55 and the list of functions of the replacement model is indicated by the argument 56, four functions, that is, "A3 size paper", "two-hole punching", "two staples on A4-size long edge", and "two staples on A4-size short edge", are extracted as a function difference 58. Then, the message controller 47 displays the extracted functions on the display device 15 as "functions that have been previously used on the original model but are not available on the replacement model". In the illustrated example, as illustrated in FIG. 10, a message 59 indicating that the four functions, that is, "A3 size paper", "two-hole punching", "two staples on A4-size long edge", and "two staples on A4-size short edge", are not available is displayed. Then, the message controller 47 returns control to the caller.

Accordingly, information on the selected model is transferred from the model selection unit 41 to the function selection unit 42, and the function selection unit 42 displays the print setting screens illustrated in FIGS. 6A and 6B corresponding to the selected model on the display device 15. When the user performs the operation of selecting a function to be used from among the functions provided by the model on the print setting screens by using the input device 16, the function selection unit 42 accepts the operation. For a function selected by the function selection unit 42, the usage record marked "YES" is recorded in the function use history of the selected model on the function use history memory 43.

The operation of the universal printer driver 40 to instruct the image forming apparatus 60 to perform a printing operation will now be described.

Figure 11:
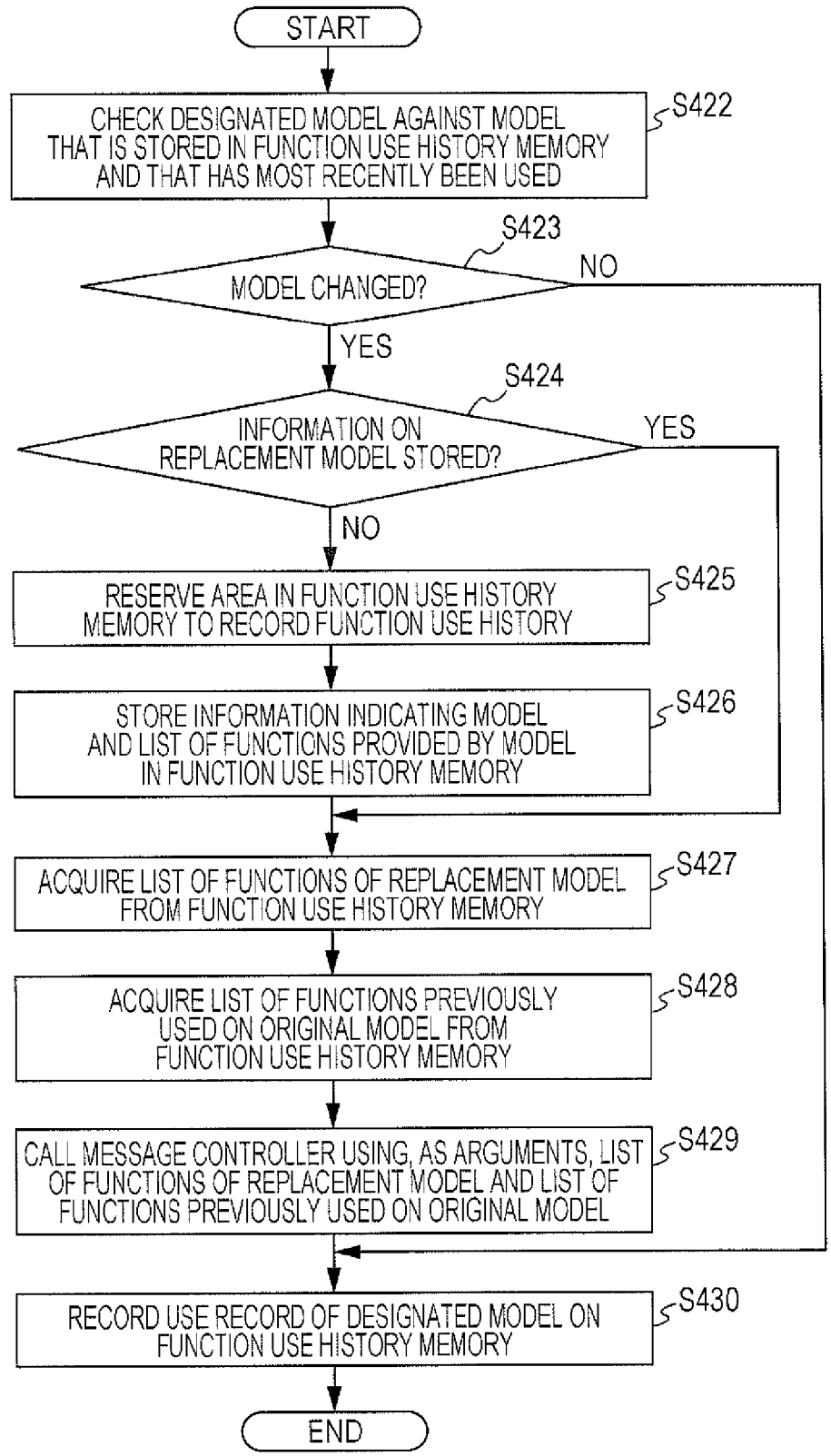
FIG. 11 is a flowchart illustrating an example of the operation of a model change determination unit of the terminal apparatus according to the exemplary embodiment of the present invention.

In some cases, the universal printer driver 40 may receive a rendering command including information that designates the model of the output destination and the function to be used from the application 20, and may perform an instruction for printing in accordance with the rendering command. In this case, the rendering command accepting unit 45 calls the model change determination unit 46 using the designated model and function as arguments. FIG. 11 is a flowchart illustrating an example of the operation of the model change determination unit 46 called in the manner described above.

As illustrated in FIG. 11, the model change determination unit 46 checks the designated model against the model that is stored in the function use history memory 43 and that has most recently been used (step S422), and determines whether the two models are different or not, that is, whether the model has been changed or not (step S423). If it is determined that the model has not been changed, the process proceeds to step S430. If it is determined that the model has been changed, the model change determination unit 46 searches the function use history memory 43, and determines whether or not the function use history for the replacement model after the change has been stored (step S424). If it is determined that the function use history for the replacement model has been stored in the function use history memory 43, the process proceeds to step S427. If it is determined that the function use history for the replacement model has not been stored in the function use history memory 43, the model change determination unit 46 reserves an area for storing the function use history for the replacement model in the function use history memory 43 (step S425). Then, the model change determination unit 46 records information (for example, the model name) that identifies the replacement model and a list of functions provided by the replacement model in the reserved area of the function use history memory 43 in the manner illustrated in FIG. 7 (step S426).

The function use history memory 43 has recorded thereon, together with the list of functions provided by the model, the usage record indicating whether or not each of the functions provided by the model has been previously used. The operation for recording a usage record on the function use history memory 43 will be described below.

Then, the model change determination unit 46 acquires a list of functions of the replacement model from the function use history memory 43 (step S427), and also acquires a list of functions previously used on the original model from the function use history memory 43 (step S428).

Then, the model change determination unit 46 calls the message controller 47 (step S429) using, as arguments, the list of functions of the replacement model, which is acquired in step S427, and the list of functions previously used on the original model, which is acquired in step S428.

Then, the message controller 47 extracts, based on the list of functions previously used on the original model and the list of functions of the replacement model, which are passed as arguments, functions which are included in the list of functions previously used on the original model and which are not included in the list of functions of the replacement model. Then, the message controller 47 displays the extracted functions on the display device 15 as "functions that have been previously used on the original model but are not available on the replacement model". Then, the message controller 47 returns control to the caller.

Thus, the model change determination unit 46 records the usage record marked "YES" for the designated functions in the function use history of the designated model on the function use history memory 43 (step S430). Then, the model change determination unit 46 returns control to the caller.

Accordingly, the rendering command accepting unit 45 translates the rendering command into the PDL output format that the image forming apparatus 60 supports, and adds a control command in accordance with the designated function to generate PDL data. Then, the rendering command accepting unit 45 outputs the PDL data to the PDL data sending unit 48. Then, the PDL data sending unit 48 sends the PDL data to the image forming apparatus 60 of the designated model via the spooler 50 and the communication I/F 14 (see FIG. 2).

If the rendering command received from the application 20 via the rendering API 30 does not include information that designates the model of the output destination and the function to be used, the rendering command accepting unit 45 uses the default model and function or the model selected by the model selection unit 41 and the function selected by the function selection unit 42 as a designated model and function. Which of them is used as a designated model and function is a matter of implementation. Then, the rendering command accepting unit 45 generates PDL data in the way described above, without calling the model change determination unit 46. Then, the PDL data sending unit 48 sends the PDL data to the image forming apparatus 60 of the designated model.

Modifications

In this exemplary embodiment, the function use history memory 43 stores a function use history for each model, and outputs, in response to a change of the model, a message indicating a function which is not available on the replacement model after the change among the functions previously used on the original model. This is not intended to be limiting in any way. For example, the function use history memory 43 may store a function use history for each image forming apparatus 60, and output, in response to a change of the image forming apparatus 60, a message indicating a function not available on the replacement image forming apparatus 60 after the change among the functions previously used on the original image forming apparatus 60. Accordingly, even if an image forming apparatus 60 of a given model is changed to another image forming apparatus 60 of the same model, a message indicating a function not available on the replacement image forming apparatus 60 after the change among the functions previously used on the original image forming apparatus 60 is output.

In this exemplary embodiment, furthermore, the function use history memory 43 does not store a function use history for each user. The function use history memory 43 may store a function use history for each user. That is, the information illustrated in FIG. 7, which is stored in the function use history memory 43, may be information on a given user, and other information having the same format as that illustrated in FIG. 7 may be stored as information on another user. In this case, the operation described above may be performed with reference to the function use history for a login user.

In this exemplary embodiment, furthermore, the universal printer driver 40 recognizes switching of models for the output destination at the time when a model is selected on the UI screen illustrated in FIG. 5B or at the time when a rendering command including information that designates the model of the output destination is received. However, this is not intended to be limiting in any way.

For example, the universal printer driver 40 may recognize switching of models for the output destination if a model different from the model having the most recent use date and time which is recorded on the function use history memory 43 is selected at various points in time such as when the UI screen of the universal printer driver 40 is opened or when a printing operation is performed.

In some cases, the universal printer driver 40 may perform the following operation: If a dedicated printer driver for the model designated as the output destination is present on the network 80, the universal printer driver 40 installs and uses the dedicated printer driver, and if a dedicated printer driver for the model designated as the output destination is not present on the network 80, the universal printer driver 40 uses the general-purpose printer driver installed therein. In a case where the universal printer driver 40 performs the above-described operation, the universal printer driver 40 may recognize switching of models for the output destination in response to, as a trigger, the selection of the general-purpose printer driver because of no dedicated printer driver present on the network 80.

In the manner described above, this exemplary embodiment may be applied to switching of printer drivers in the universal printer driver 40 from, for example, the dedicated printer driver for the model A to the general-purpose printer driver. In this case, in step S407 of FIG. 8 and step S427 of FIG. 11, a list of functions provided by the general-purpose printer driver may be acquired in place of a list of functions of the replacement model.

In this exemplary embodiment, furthermore, the universal printer driver 40 informs the user of functions which are not included in the functions of the replacement model among the functions previously used on the original model. This is not intended to be limiting in any way. For example, the user may be informed of functions which are not included in the functions of the replacement model among the functions of the original model whose frequency of use is greater than or equal to a predetermined value. Alternatively, for more general application, the user may be informed of functions which are not included in the functions of the replacement model among the functions identified in accordance with the usage record of the original model.

A program that implements this exemplary embodiment may be provided via a communication unit, or may also be stored in a recording medium such as a compact disc read-only memory (CD-ROM) and provided.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print instruction assistance device comprising:
an acquisition unit, operable on a processor, that acquires usage record information concerning a usage record of a plurality of functions of each of a plurality of printers;
a recognition unit, operable on the processor, that recognizes a change of a printer to be used for printing among the plurality of printers from a first printer to a second printer; and
an output unit, operable on the processor, that outputs information indicating a function which is identified in accordance with the usage record information among a plurality of functions of the first printer and which is not included in the second printer, wherein
the usage record information acquired by the acquisition unit indicates whether or not each of a plurality of functions of each of the plurality of printers has previously been used by a print instructor who gives printing instructions,
the recognition unit recognizes a change of a printer to be used for printing among the plurality of printers from the first printer to the second printer in accordance with an operation of the print instructor, and
the output unit identifies a function which has previously been used by the print instructor among the plurality of functions of the first printer in accordance with the usage record information.

2. The print instruction assistance device according to claim 1, wherein the usage record information acquired by the acquisition unit indicates whether or not each of a plurality of functions of each of the plurality of printers has previously been used, and
the output unit identifies a function that has previously been used among the plurality of functions of the first printer in accordance with the usage record information.

3. The print instruction assistance device according to claim 1, wherein
the recognition unit recognizes a change of a printer to be used for printing among the plurality of printers from the first printer to the second printer in accordance with an operation on a screen for changing a printer to be used for printing among the plurality of printers from the first printer to the second printer.

4. The print instruction assistance device according to claim 1, wherein
the recognition unit recognizes a change of a printer to be used for printing among the plurality of printers from the first printer to the second printer in accordance with print instruction information for instructing the second printer to perform a printing operation, the print instruction information being received while the first printer among the plurality of printers is being used for printing.

5. A printing system comprising:
a plurality of printers that each print an image on a recording medium; and
a print instruction apparatus that instructs one of the plurality of printers to perform a printing operation, the print instruction apparatus including
an acquisition unit, operable on a processor, that acquires usage record information concerning a usage record of a plurality of functions of each of the plurality of printers,
a recognition unit, operable on the processor, that recognizes a change of a printer to be used for printing among the plurality of printers from a first printer to a second printer, and
an output unit, operable on the processor, that outputs information indicating a function which is identified in accordance with the usage record information among a plurality of functions of the first printer and which is not included in the second printer, wherein
the usage record information acquired by the acquisition unit indicates whether or not each of a plurality of functions of each of the plurality of printers has previously been used by a print instructor who gives printing instructions,
the recognition unit recognizes a change of a printer to be used for printing among the plurality of printers from the first printer to the second printer in accordance with an operation of the print instructor, and
the output unit identifies a function which has previously been used by the print instructor among the plurality of functions of the first printer in accordance with the usage record information.

6. A non-transitory computer readable medium storing a program causing a computer to execute a process, the process comprising:
acquiring usage record information concerning a usage record of a plurality of functions of each of a plurality of printers;
recognizing a change of a printer to be used for printing among the plurality of printers from a first printer to a second printer; and
outputting information indicating a function which is identified in accordance with the usage record information among a plurality of functions of the first printer and which is not included in the second printer, wherein
the usage record information indicates whether or not each of a plurality of functions of each of the plurality of printers has previously been used by a print instructor who gives printing instructions,
a change of a printer to be used for printing among the plurality of printers from the first printer to the second printer is recognized in accordance with an operation of the print instructor, and
a function which has previously been used by the print instructor among the plurality of functions of the first printer is identified in accordance with the usage record information.

7. A method comprising:
acquiring usage record information concerning a usage record of a plurality of functions of each of a plurality of printers;
recognizing a change of a printer to be used for printing among the plurality of printers from a first printer to a second printer; and
outputting information indicating a function which is identified in accordance with the usage record information among a plurality of functions of the first printer and which is not included in the second printer, wherein
the usage record information indicates whether or not each of a plurality of functions of each of the plurality of printers has previously been used by a print instructor who gives printing instructions,
a change of a printer to be used for printing among the plurality of printers from the first printer to the second printer is recognized in accordance with an operation of the print instructor, and a function which has previously been used by the print instructor among the plurality of functions of the first printer is identified in accordance with the usage record information.

\* \* \* \* \*